(12) United States Patent  
Tani (10) Patent No.: US 6,392,735 B1
(45) Date of Patent: May 21, 2002

(54) LIQUID CRYSTAL DISPLAY APPARATUS WITH SEALING ELEMENT INCLUDING CONDUCTIVE SPACERS

(75) Inventor: Masatoshi Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/671,160

(22) Filed: Sep. 28, 2000

(30) Foreign Application Priority Data

Sep. 29, 1999 (JP) ............................................. 11-276014

(51) Int. Cl.[7] .............................................. G02F 1/1339
(52) U.S. Cl. ...................... 349/156; 349/155; 349/157; 349/153
(58) Field of Search ................................ 349/155, 156, 349/38, 39, 106, 149, 152, 153

(56) References Cited

U.S. PATENT DOCUMENTS

| | | | | |
|---|---|---|---|---|
| 4,600,273 A | * | 7/1986 | Ohno | 349/155 |
| 5,748,266 A | * | 5/1998 | Kodate | 349/39 |
| 5,757,451 A | * | 5/1998 | Miyazaki et al. | 349/106 |
| 5,982,471 A | * | 11/1999 | Hirakata et al. | 349/155 |
| 6,088,071 A | * | 7/2000 | Yamamoto et al. | 349/38 |
| 6,147,729 A | * | 11/2000 | Kurauchi et al. | 349/106 |

FOREIGN PATENT DOCUMENTS

| | | |
|---|---|---|
| JP | 2-220031 | 9/1990 |
| JP | 4-153626 | 5/1992 |
| JP | 4-350626 | 12/1992 |
| JP | 8-262484 | 10/1996 |
| JP | 9-152620 | 6/1997 |
| JP | 10-68955 | 3/1998 |
| JP | 11-183915 | 7/1999 |
| JP | 11-248921 | 9/1999 |

* cited by examiner

Primary Examiner—Kenneth Parker
Assistant Examiner—David Chung
(74) Attorney, Agent, or Firm—McGinn & Gibb, PLLC (57) ABSTRACT

In a liquid crystal display apparatus, a transfer electrode is formed on a first insulating substrate, and a columnar spacer and a counter electrode are formed on a second insulating substrate. A sealing element formed by seal material and conductive spacers adheres and seals the first and second insulating substrates, so that the counter electrode is in contact with the transfer electrode through the conductive spacers.

20 Claims, 14 Drawing Sheets

LIQUID CRYSTAL DISPLAY APPARATUS WITH SEALING ELEMENT INCLUDING CONDUCTIVE SPACERS

BACKGROUND OF THE INVENTION

1. Field of the Invention

The present invention relates to a liquid crystal display (LCD) apparatus and its manufacturing method.

2. Description of the Related Art

Generally, an LCD apparatus is constructed by a transparent insulating substrate on which: thin film transistors, pixel electrodes and the like are formed, and a counter transparent insulating substrate (counter substrate) on which a counter electrode is formed. In this case, the voltage at the counter electrode should be maintained at a predetermined value.

In a first prior art LCD apparatus (see JP-A-2-220031 & JP-A-4-153626), in order to apply a voltage to the counter electrode, transfer electrodes are provided on two or four edges of the transparent insulating substrate. The counter electrode is in contact with the transfer electrodes by paste including conductive spacers. This will be explained later in detail.

In the above-described first prior art LCD apparatus, however, since the number of the transfer electrodes is limited, the resistance between the transfer electrodes and the counter electrode is so large that the voltage at the counter electrode cannot be maintained at a predetermined value. Also, since the diameter of sealing peripheral spacers is about the same as that of the conductive spacers while the gap for the sealing peripheral spacers is different from the gap for the conductive spacers, stress may be generated so that irregular display occurs, thus degrading the display quality. Further, since the sealing peripheral spacers press data bus lines as well as scan bus lines, the data bus lines and the scan bus lines may be disconnected. Additionally, since a step for coating seal material is different from a step for coating the paste including conductive spacers, the manufacturing cost may be increased.

In a second prior art LCD apparatus (see JP-A-8-262484), an auxiliary line also serves as means for applying a voltage to a counter electrode via a columnar spacer. That is, in order to electrically connect the auxiliary line to the counter electrode, the columnar spacer formed by color filter layers is provided at pixels. This also will be explained later in detail.

In the above-described second prior art LCD apparatus, since a voltage is applied from a large number of location to the counter electrode, the resistance between the auxiliary line and the counter electrode is so small that the voltage at the counter electrode can be surely maintained at a predetermined value. Also, since no stress is generated, irregular display may not occur, thus improving the display quality. Further, the data bus lines and the scan bus lines may not be disconnected. Additionally, since a step for dispersing display spacers is unnecessary, the manufacturing cost can be decreased.

In the above-described second prior art LCD apparatus, however, if the counter electrode is a little oxidized or contaminated by insulating material, the counter electrode is no t always in contact with the auxiliary line, so that the electrical connection therebetween is unstable, particularly when vibration or impact is applied to the LCD apparatus.

SUMMARY OF THE INVENTION

It is an object of the present invention to provide an LCD apparatus and its manufacturing method, capable of stably and remarkably decreasing the resistance between a counter electrode and a transfer electrode.

According to the present invention, in an LCD apparatus, a transfer electrode is formed on a first insulating substrate, and a columnar spacer and a counter insulating substrate, and a columnar spacer and a counter electrode are formed on a second insulating substrate. A sealing element formed by seal material and conductive spacers adheres and seals the first and second insulating substrates, so that the counter electrode is in contact with the transfer electrode through the conductive spacers.

Also, in a method for manufacturing an LCD apparatus, a transfer electrode is formed on a first insulating substrate, a first columnar spacer and electrode a counter are formed on a second insulating substrate. Then, seal material including conductive spacers is coated on a periphery of at least one of the first and second insulating substrates. Then, the first and second insulating substrates are adhered, so that the counter electrode is in contact with the transfer electrode through the conductive spacers.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, prior art LCD apparatuses will be explained with reference to FIGS. 1, 2, 3, 4, 5, 6 and 7.

Figure 1:
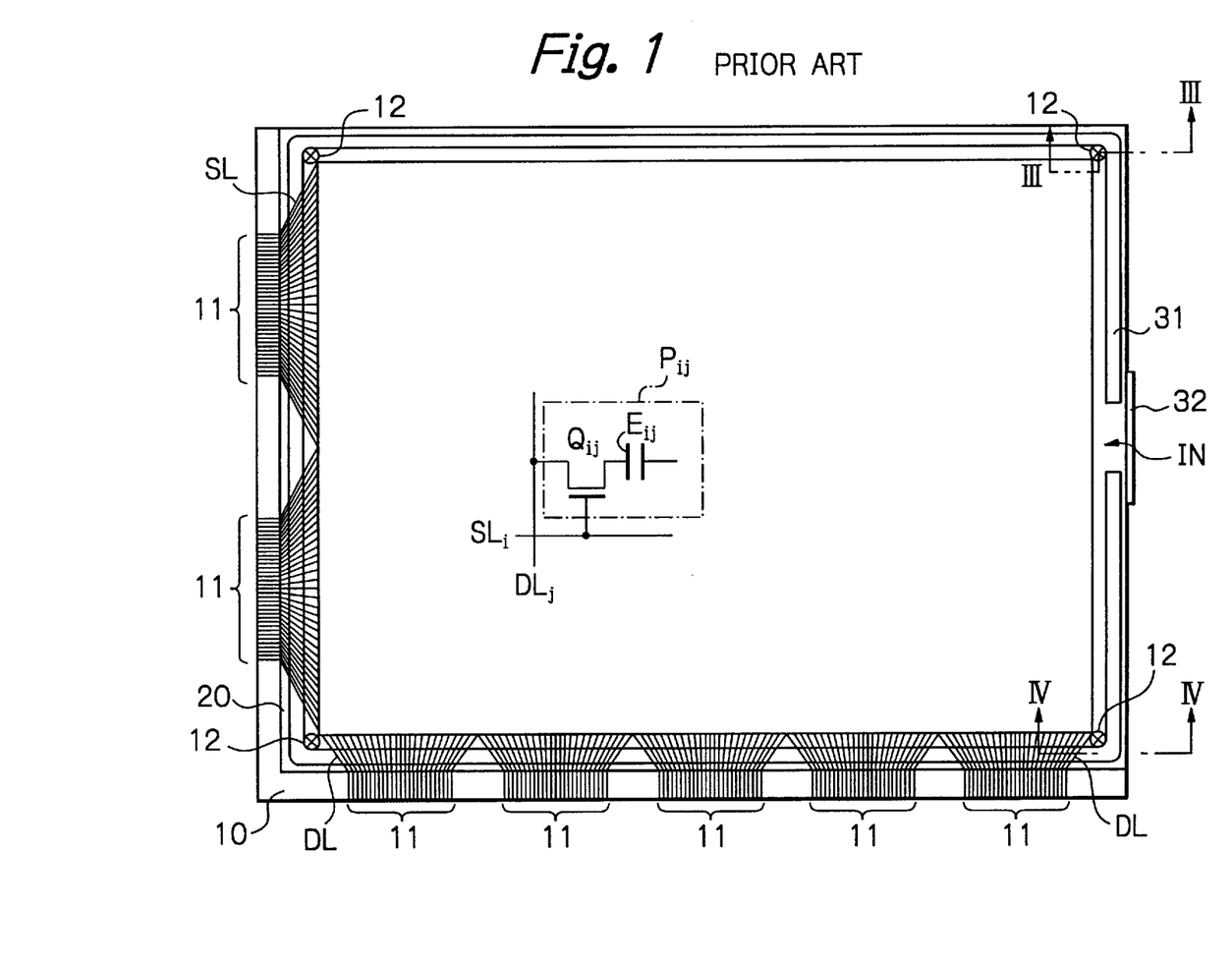
FIG. 1 is a plan view illustrating a first prior art LCD apparatus.

In FIG. 1, which illustrates a first prior art LCD apparatus (see JP-A-2-220031 & JP-A-4-153626), scan bus lines SL and data bus lines DL are provided on a transparent insulating substrate 10, and pixels $P_{ij}$ formed by a TFT $Q_{ij}$ and a transparent pixel electrode $E_{ij}$ are provided at intersections between the scan bus lines SL and the data bus lines DL.

Also, terminals 11 are provided on the transparent insulating substrate 10 and are connected to the scan bus lines SL and the data bus lines DL. Also, a sealing element 31 is provided on the periphery of the transparent insulating substrate 10, where a liquid crystal injecting opening IN is provided. Further, a clogging element 32 is provided to clog liquid crystal within the sealing element 31.

Figure 3:
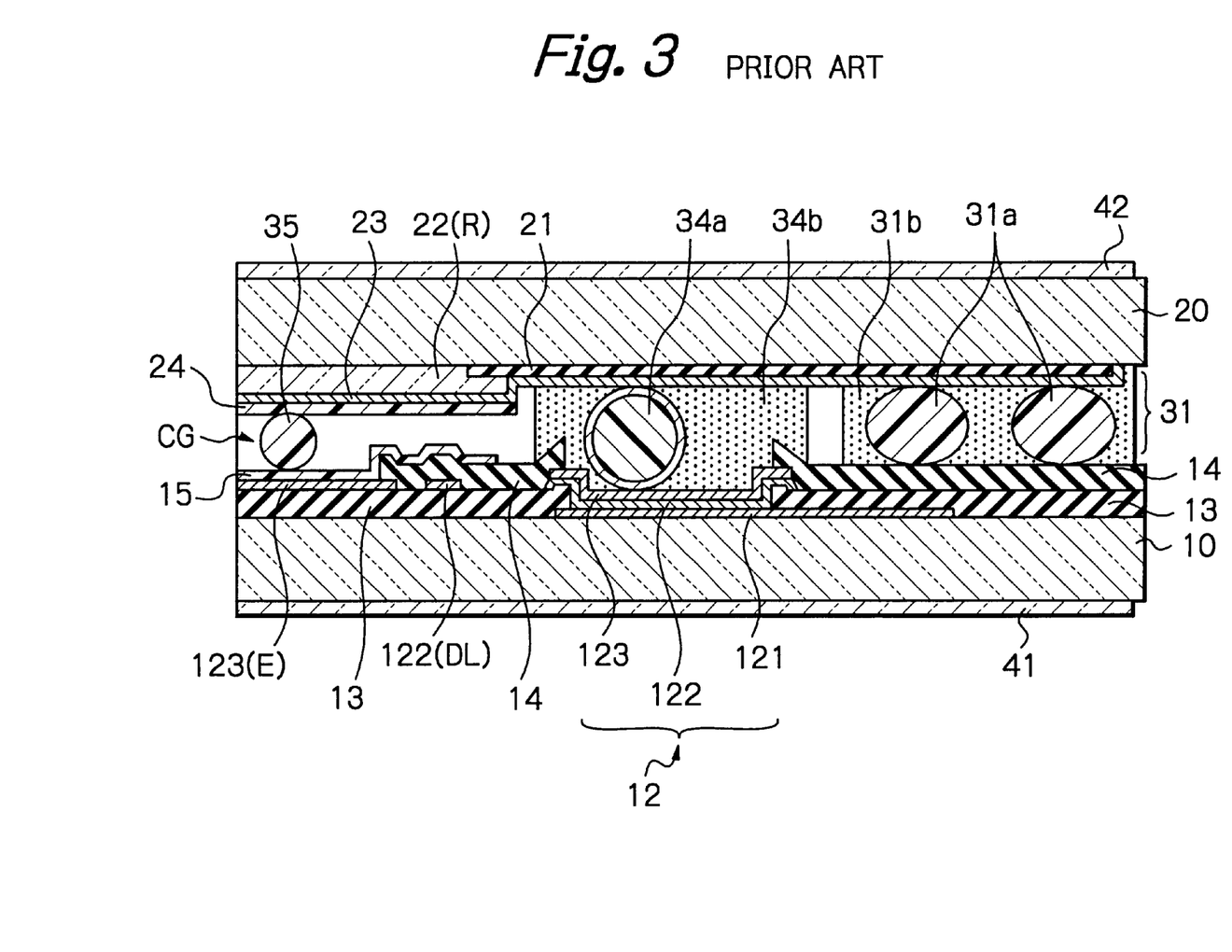
FIGS. 3 and 4 are cross-sectional views taken along with the lines III—III and IV—IV, respectively, of FIG. 1.
Figure 4:
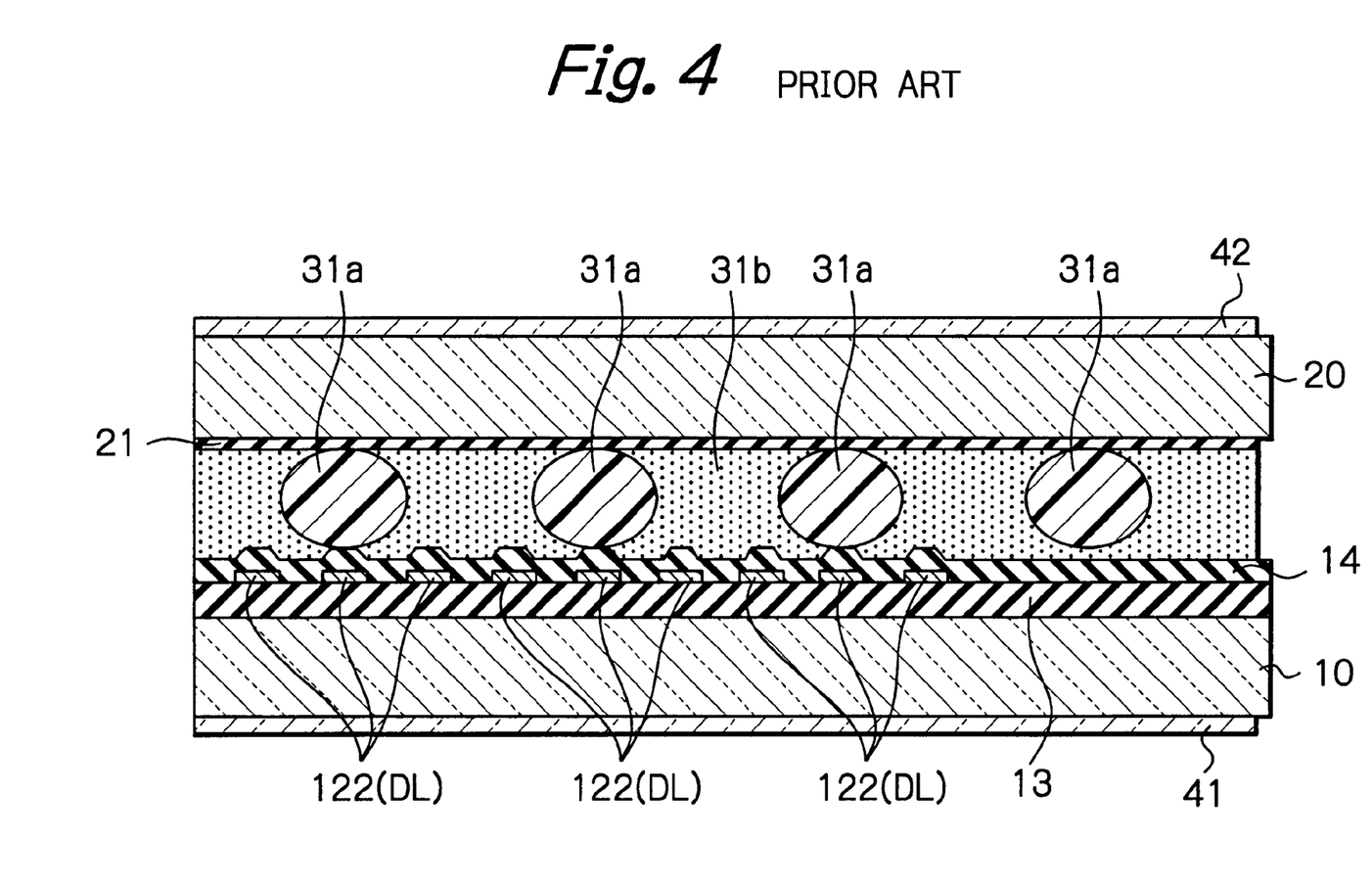

In FIG. 1, a counter transparent insulating substrate (hereinafter, simply referred to as a counter substrate) 20 and a counter electrode 23, which are not shown in FIG. 1, but are shown in FIGS. 3 and 4, are provided.

In order to apply a definite voltage to the counter electrode 23, four transfer electrodes 12 are provided on the four edges of the transparent insulating substrate 10 within the sealing element 31.

Figure 2:
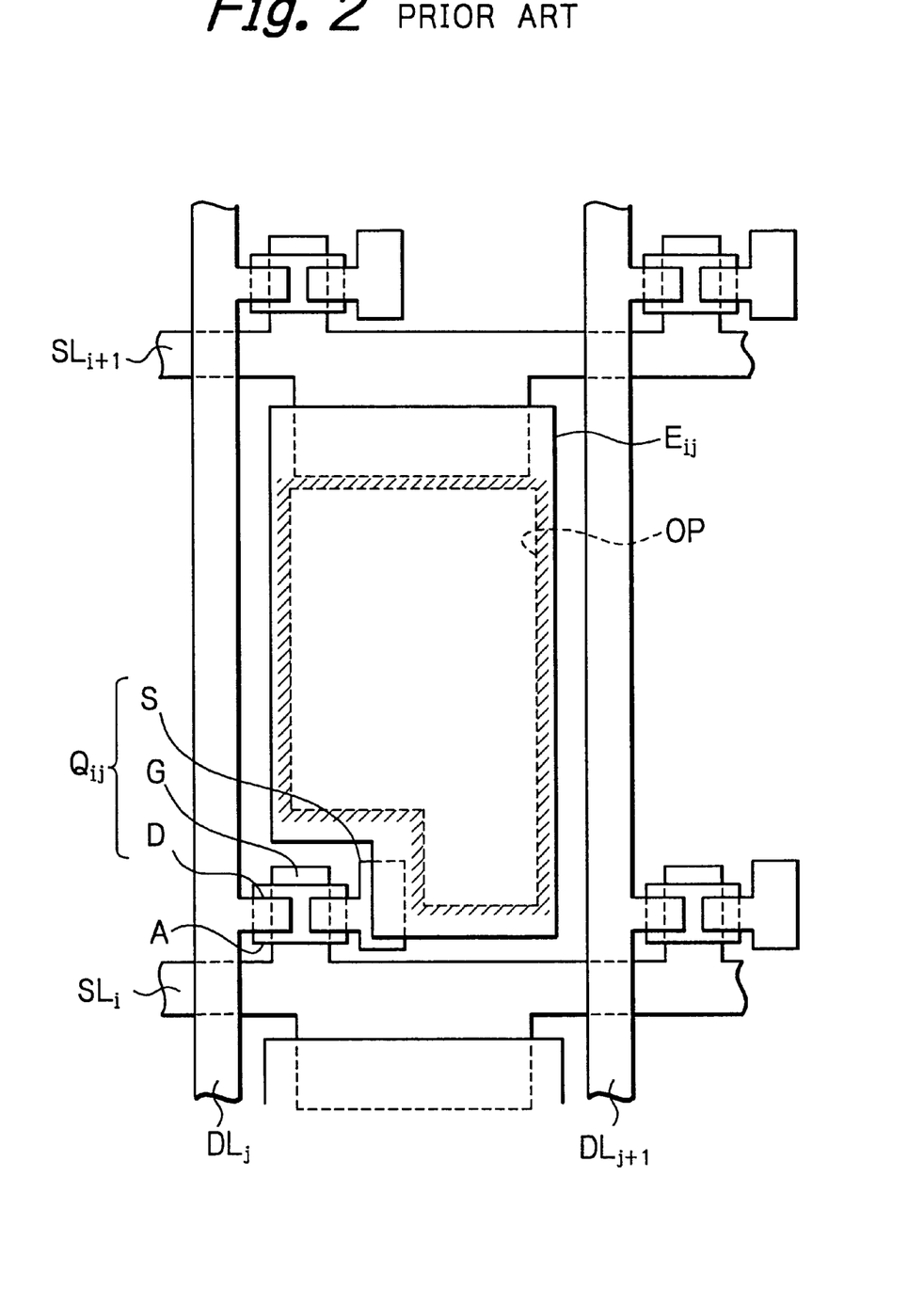
FIG. 2 is a plan view illustrating the pixel portion of FIG. 1.

In FIG. 2, which illustrates the pixel $P_{ij}$ of FIG. 1, the TFT $Q_{ij}$ is formed by a gate electrode G shunted from the scan bus lined $SL_i$, a semiconductor active layer A made of amorphous silicon opposing the gate electrode G, a drain electrode D shunted from the data bus line $DL_j$ and a source electrode S connected to the transparent pixel electrode $E_{ij}$. One end of the semiconductor active layer A is connected to the source electrode S, while the other end of the semiconductor active layer A is connected to the drain electrode D.

In FIG. 2, note that OP designates an opening of an optical shield block matrix layer 21 (see FIGS. 3 and 4).

Also, in FIG. 2, the adjacent scan bus line $SL_{i+1}$ is partly superposed onto the transparent pixel electrode $E_{ij}$, to increase the capacitance thereof. This is called a gate storage type.

In FIGS. 3 and 4, which are cross-sectional views taken along the lines III—III and IV—IV, respectively, of FIG. 1, a conductive layer 121 and an insulating layer 13 are formed on the transparent insulating substrate 10. Note that the conductive layer 121 is also used for the scan bus lines $SL_1$, $SL_{i-1}$, . . . of FIG. 2. Also, a conductive layer 122 is formed on the conductive layer 122 (DL) serves as the data bus line $DL_j$, $DL_{j+1}$, . . . of FIG. 2. Further, a conductive layer 123 is formed on the conductive layer 122 and the insulating layer 13. Note that the conductive layer 123 (E) serves as transparent pixel element $E_{ij}$ of FIG. 2. Additionally, an insulating layer 14 is formed on the entire surface except for the conductive layer 123. Also, an orientation layer 15 is formed on the conductive layer 123 (E).

The conductive layers 121, 122 and 123 form the transfer electrode 12.

On the other hand, an optical shield black matrix layer 21 and a red color filter layer 22 are formed on the counter substrate 20. Also, a counter electrode 23 is formed on the optical shield black matrix layer 21 and the red color filter layer 22. Further, an orientation layer 24 is formed on the red color filter 22.

The transparent insulating substrate 10 and the counter substrate 20 are adhered by the sealing element 31 formed by peripheral spacers 31a enclosed by seal material 31b. In this case, conductive spacers 34a enclosed by paste 34b are provided in order to electrically connect the transfer electrode 12 to the counter electrode 23. Simultaneously, display spacers 35 are dispersed into a cell gap CG between the transparent insulating substrate 10 and the counter substrate 20 surrounded by the sealing element 31, thus maintaining the cell gap CG.

Additionally, polarization plates 41 and 42 are adhered to the transparent insulating substrate 10 and the counter substrate 20, respectively.

In the LCD apparatus of FIGS. 1, 2 and 3, since the diameter of the peripheral spacers 31a is about the same as that of the conductive spacers 34a and the paste 34b has the same material as the seal material 31b, the contact characteristics and thermal expansion coefficient of the paste 34b are about the same as those of the sealing element 31, so that the cell gap CG between the transparent insulating substrate 10 and the counter substrate 20 can be uniform. Also, since the ratio of the conductive spacers 34a to the paste 34b is small, i.e., about 0.5 wt %, the conductive spacers 34a are hardly in contact with liquid crystal filled in the cell gap CG between the transparent insulating substrate 10 and the counter substrate 20, which increases the lifetime of the liquid crystal and improves the display quality.

In the LCD apparatus of FIGS. 1, 2 and 3, however, since the number of the transfer electrodes 12 is limited, the resistance between the transfer electrodes 12 and the counter electrode 23 is so large that the voltage at the counter electrode 23 cannot be maintained at a predetermined value. Also, since the diameter of the peripheral spacers 31a is about the same as that of the conductive spacers 34a while the gap for the peripheral spacers 31a is different from the gap for the conductive spacers 34a, stress may be generated so that irregular display occurs, thus degrading the display quality. Further, as illustrated in FIG. 4, since the peripheral spacers 31a press the data bus lines DL as well as the scan bus lines SL, the data bus lines DL and the scan bus lines SL may be disconnected. Additionally, since a step for coating the seal material 31b is different from a step for coating the paste 34b, the manufacturing cost may be increased.

Figure 5:
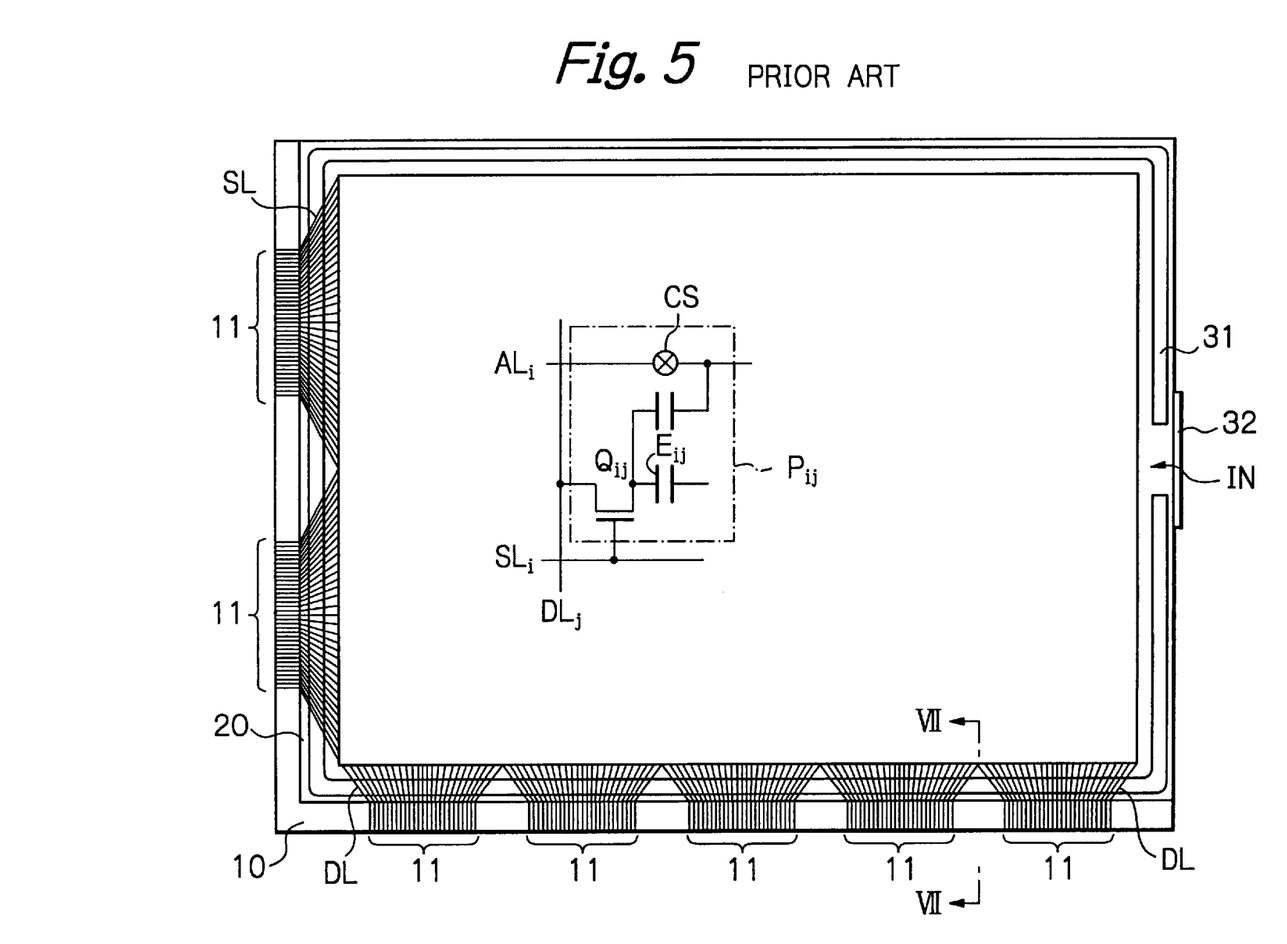
FIG. 5 is a plan view illustrating a first prior art LCD apparatus.
Figure 6:
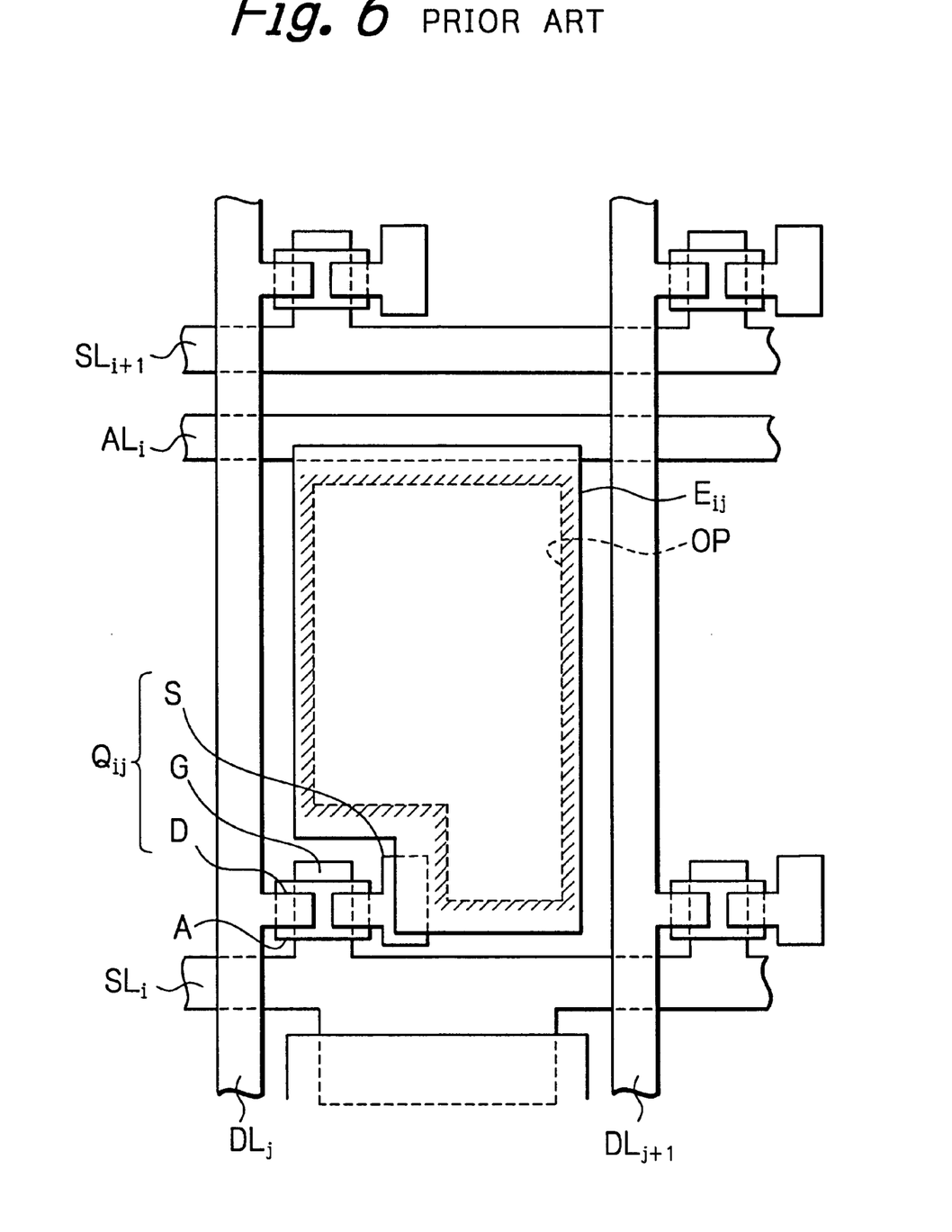
FIG. 6 is a plan view illustrating the pixel portion of FIG. 5.

In FIG. 5, which illustrates a second prior art LCD apparatus (see JP-A-8-262484), an auxiliary line $AL_i$ is partly superposed onto the transparent pixel electrode $P_{ij}$ as illustrated in FIG. 6, to substantially increase the capacitance thereof. In this case, the auxiliary line $AL_i$ also serves as means for applying a voltage to the counter electrode 23 via a columnar spacer CS.

Figure 7:
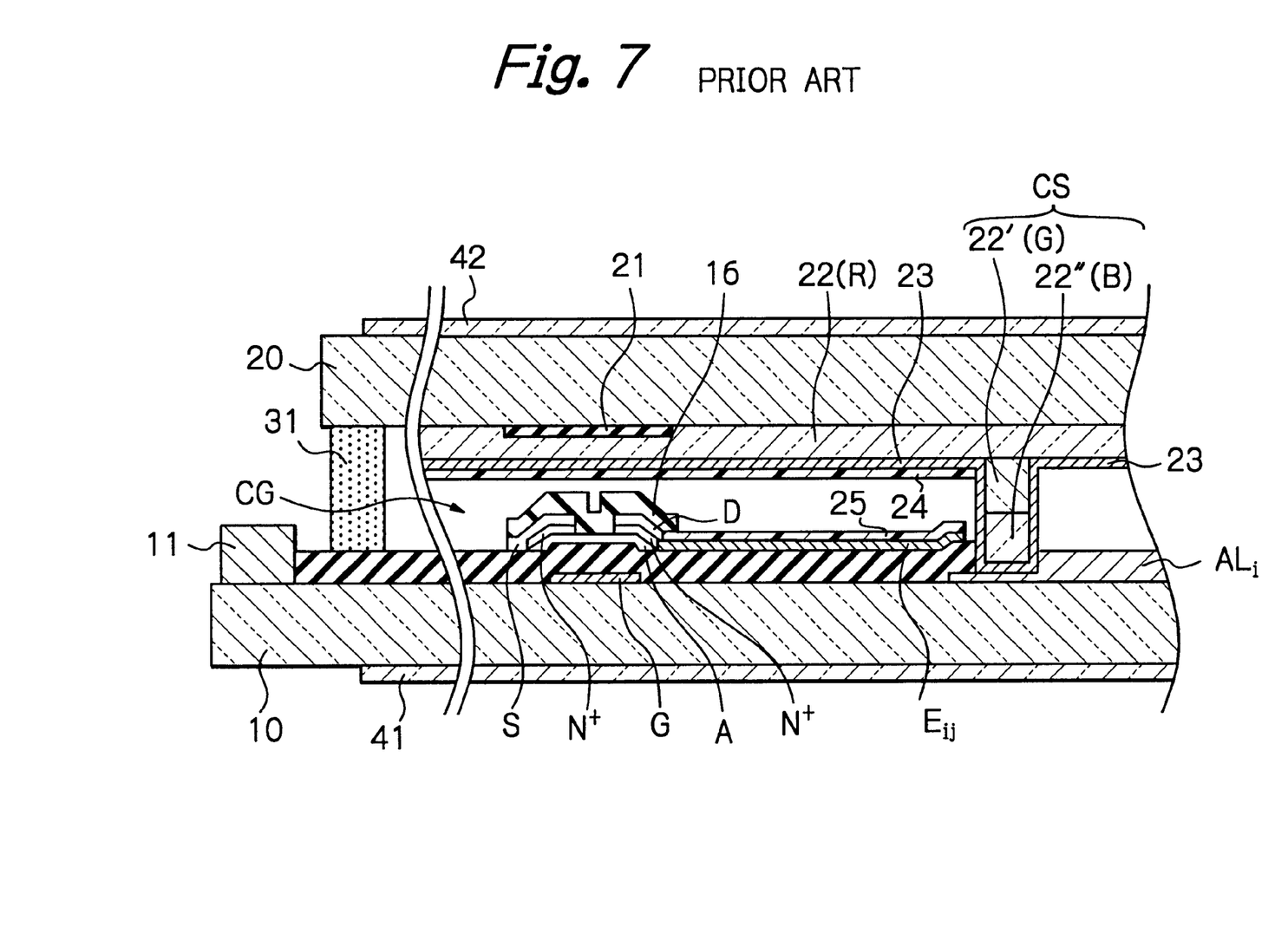
FIG. 7 is a cross-sectional view taken along with the lines VII—VII of FIG. 5.

In FIG. 7, which is a cross-sectional view taken along the line VII—VII of FIG. 5, in order to electrically connect the auxiliary line $AL_i$ to the counter electrode 23, the columnar spacer CS formed by a green color filter layer 22' and a blue color filter layer 22" is provided.

In FIG. 7, note that N⁺ designates an N-type impurity region and 16 designates an insulating layer.

In the LCD apparatus of FIGS. 5, 6 and 7, since a voltage is applied from a large number of locations, i.e., the locations of the pixels $P_{ij}$ to the counter electrode 23, the resistance between the auxiliary line $AL_i$ and the counter electrode 23 is so small that the voltage at the counter electrode 23 can be surely maintained at a predetermined value. Also, since no stress is generated, irregular display may not occur, thus improving the display quality. Further, since the peripheral spacers 31a of FIG. 4 are unnecessary, the data bus lines DL and the scan bus lines SL may not be disconnected. Additionally, since a step for coating the paste 34b of FIG. 3 and a step for dispersing the display spacers 35 of FIG. 3 are unnecessary, the manufacturing cost can be decreased.

In the LCD apparatus of FIGS. 5, 6 and 7, however, if the counter electrode 23 is a little oxidized or contaminated by insulating material, the counter electrode 23 is not always in contact with the auxiliary line $AL_i$, so that the electrical connection therebetween is unstable, particularly when vibration or impact is applied to the LCD apparatus.

Figure 8:
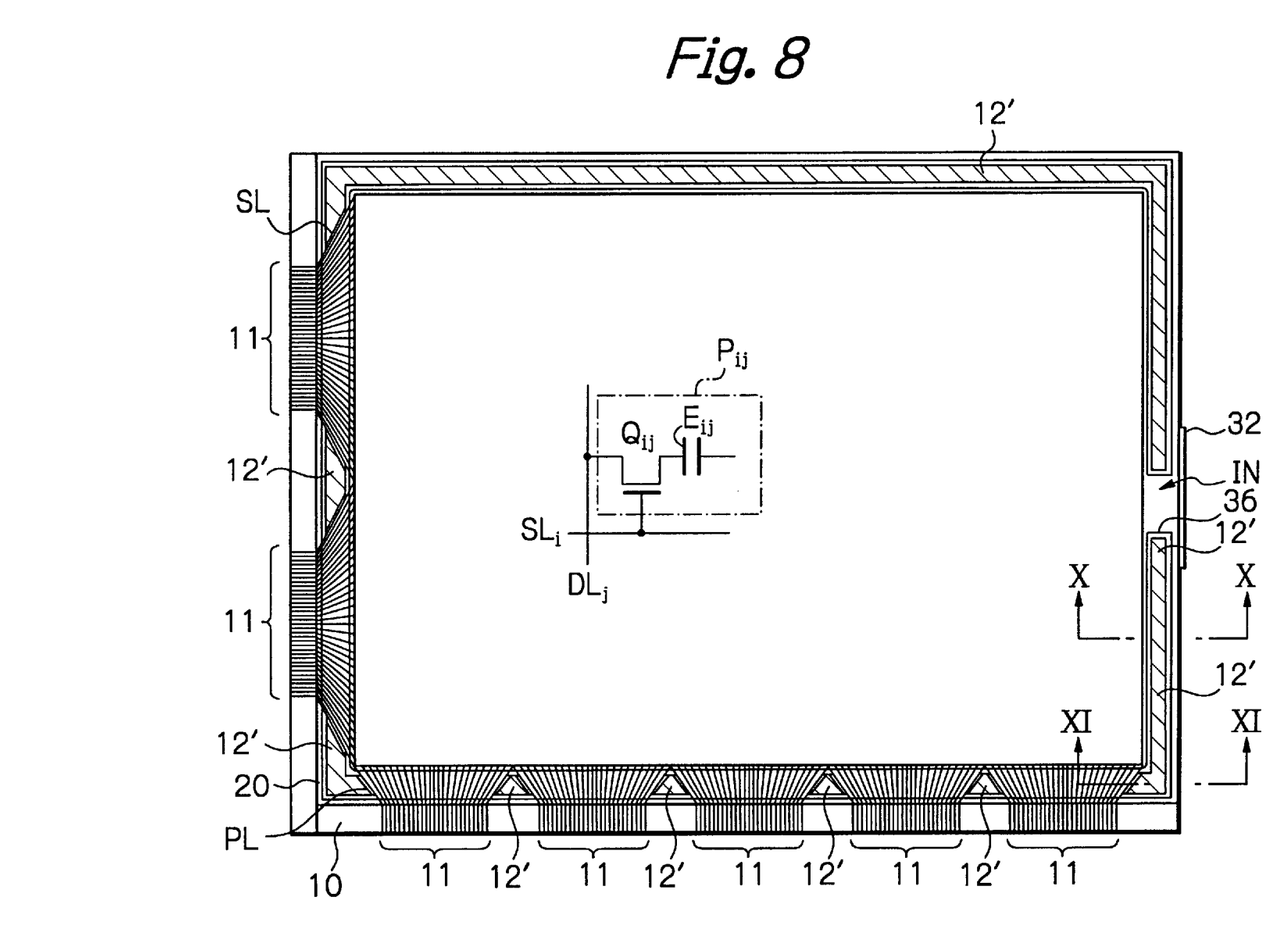
FIG. 8 is a plan view illustrating a first embodiment of the LCD apparatus according to the present invention.
Figure 9:
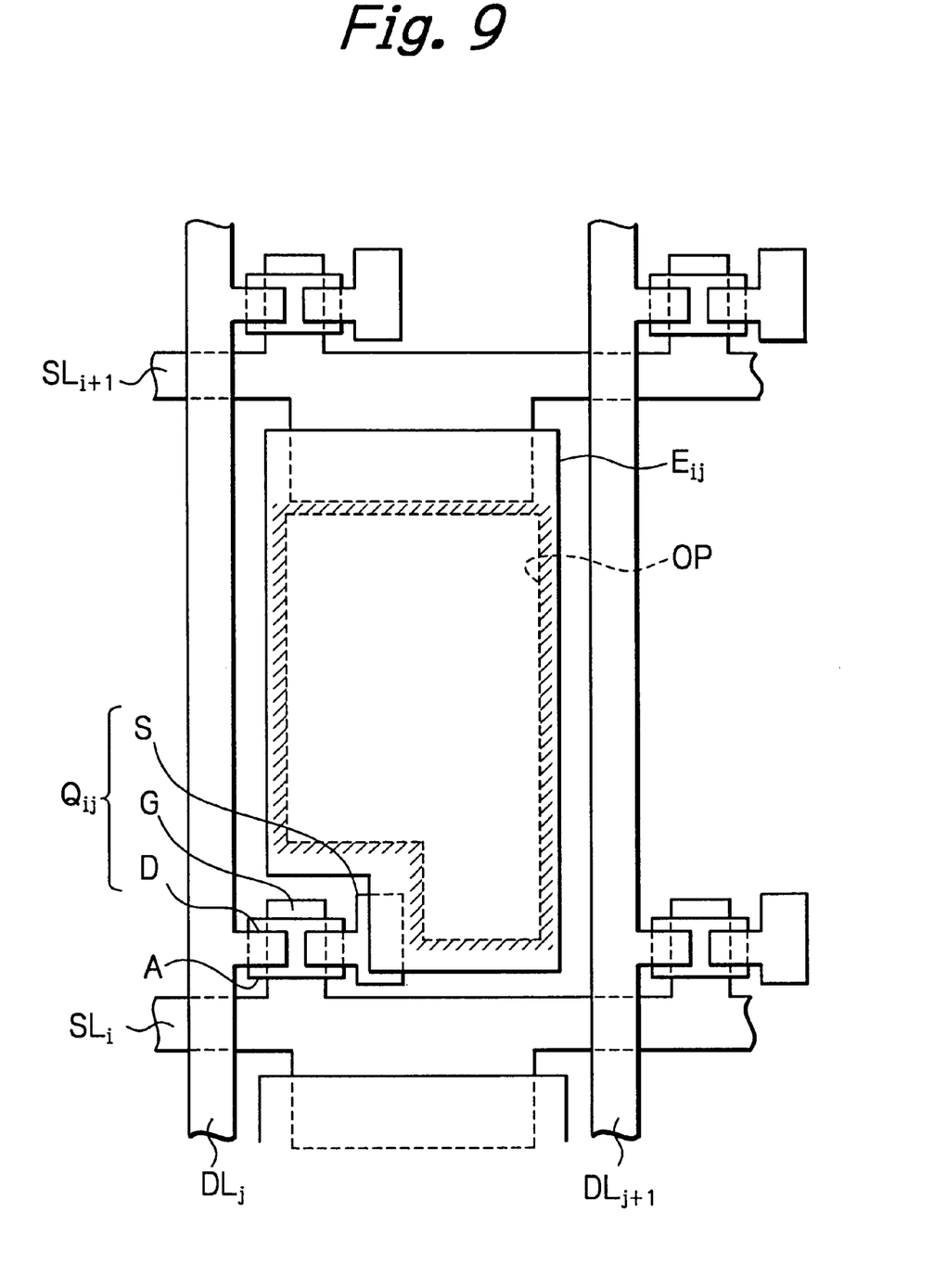
FIG. 9 is a plan view illustrating the pixel portion of FIG. 8.
Figure 10:
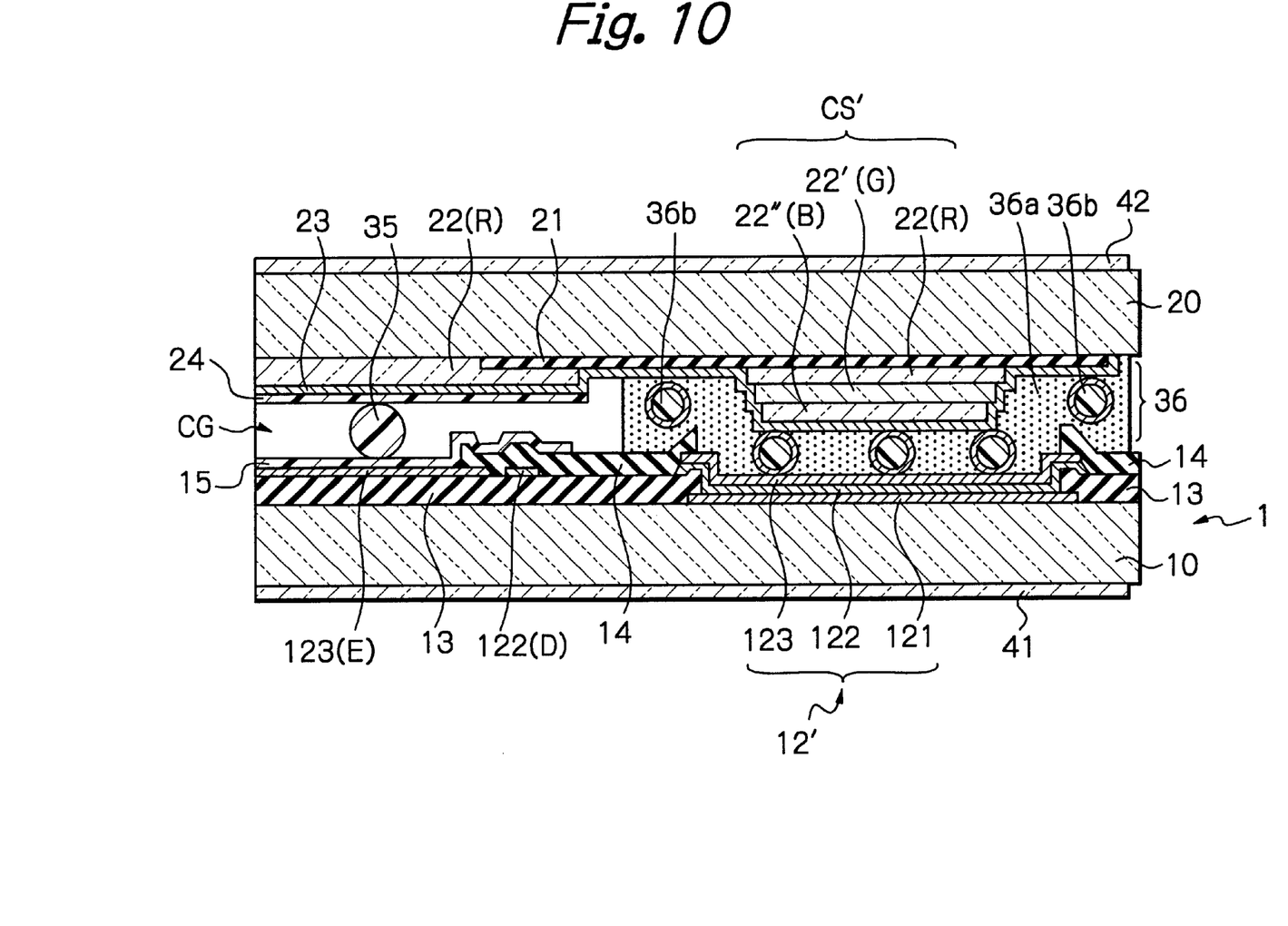
FIGS. 10 and 11 are cross-sectional views taken along the lines X—X and XI—XI, respectively, of FIG. 8.
Figure 11:
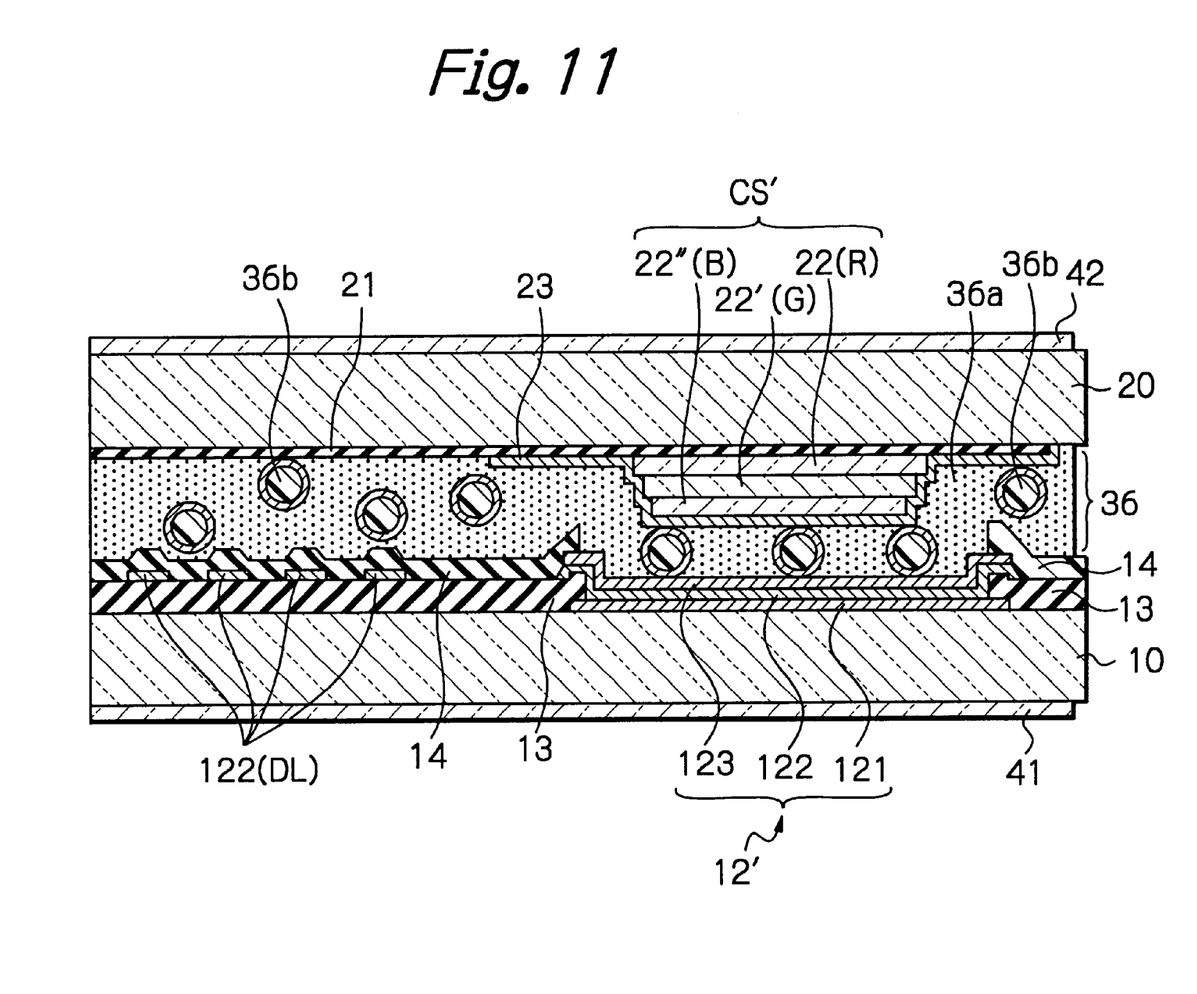

FIG. 8 is a plan view illustrating a first embodiment of the LCD apparatus according to the present invention, FIG. 9 is a plan view of the pixel portion of FIG. 8, and FIGS. 10 and 11 are cross-sectional views taken along the lines X—X and XI—XI, respectively, of FIG. 8. Note that FIG. 9 is the same as FIG. 2.

In FIGS. 8, 10 and 11, the sealing element 31 formed by the peripheral spacers 31a enclosed by the seal material 31b and the conductive spacers 34a enclosed by the paste 34b of the LCD apparatus of FIGS. 1, 3 and 4 are replaced by a sealing element 36 formed by conductive peripheral spacers 36a enclosed by seal material 36b. Also, a transfer electrode 12' is provided at the periphery of the transparent insulating substrate 10 corresponding to the sealing element 36.

As illustrated in FIGS. 10 and 11, a columnar spacer CS' formed by the red color filter layer 22, the green color filter layer 22' and the blue color filter layer 22" is provided to correspond to the transfer electrode 12'.

Thus, since the transfer electrode 12' is widely provided at the periphery of the transparent insulating substrate 10, the resistance between the transfer electrode 12' and the counter electrode 23 is decreased so that the voltage at the counter electrode 23 can be surely maintained at a predetermined value. Also, since the gap between the transfer electrode 12' and the counter electrode 23 is adjusted by the columnar spacer CS', stress may not be generated so that irregular display may not occur, thus improving the display quality. Further, as illustrated in FIG. 11, the conductive peripheral spacers 36a do not press the data bus lines DL as well as the scan bus lines SL, the data bus lines DL and the scan bus lines SL may not be disconnected. Additionally, since a step for coating the paste 34b of the LCD apparatus of FIG. 3 is unnecessary, the manufacturing cost can be decreased. Further, since the counter electrode 23 is completely in contact with the transfer electrode 12' by the conductive peripheral spacer 36b, the electrical connection between the counter electrode 23 and the transfer electrode 12' is stable even if vibration or impact is applied to the LCD apparatus.

The method for manufacturing the LCD apparatus of FIGS. 8, 9, 10 and It will be explained below.

First an about 0.5 to 1.5 mm thick transparent insulating substrate 10 made of inorganic glass such as silica glass, boric silicic acid galss, alumina silicic acid glass or soda lime glass, or organic plastic is prepared. The transparent insulating substrate 10 is cleaned and rinsed by cleaning liquid and pure water to remove contamination and particles on the surface thereof.

Next, an about 100 to 300 nm thick conductive layer 121 made of Cr, Al, Ta or Mo is deposited on the transparent insulating layer 10 by a vacuum sputtering process. Then, the conductive layer 121 is patterned to form the terminals 11, the scan bus lines SL (the gate electrode G) and the conductive layer 121 of the transfer electrode 12'.

Next, an about 200 to 300 nm thick insulating layer 13 made of silicon oxide or silicon nitride, an about 50 to 300 nm thick non-doped amorphous silicon layer (not shown) and an about 30 to 100 nm thick doped amorphous silicon layer (not shown) are sequentially deposited on the entire surface. Then, the insulating layer 13, the non-doped amorphous silicon layer and the doped amorphous silicon layer are patterned. In this case, the patterned insulating layer 13 also serves as a gate insulating layer (not shown) of the TFT $Q_{ij}$, the patterned non-doped amorphous silicon layer (not shown) serves as a channel layer of the TFT $Q_{ij}$, and the patterned doped amorphous silicon layer (not shown) serves as contact regions of the TFT $Q_{ij}$.

Next, an about 100 to 300 nm thick conductive layer 122 made of Cr, Al, Ta or Mo is deposited on the entire surface by a vacuum sputtering process. Then, the conductive layer 122 is patterned to form the terminals 11, the data bus lines $DL_j$, the drain electrode D, and the conductive layer 122 of the transfer electrode 12'.

Next, an about 30 to 100 nm thick conductive layer 123 made of indium tin oxide (ITO) is deposited on the entire surface by a sputtering process. Then, the conductive layer 123 is patterned to form the terminals 11, the pixel electrode $E_{ij}$ and the conductive layer 123 of the transfer electrode 12'. In this case, the pixel electrode $E_{ij}$ is connected to the source electrode S.

Next, a part of the doped amorphous silicon layer (not shown) on the channel layer (not shown) is removed so that the source electrode S is electrically disconnected from the drain electrode D.

Next, an insulating layer 14 made of silicon nitride is deposited on the entire surface by a chemical vapor deposition (CVD) process, and is patterned.

Next, an about 50 to 100 nm thick orientation layer 15 made of polyimide is coated on the conductive layer 123 except for the transfer electrode 12'. Then, the orientation layer 15 is baked at a temperature of about 200° C. for about 30 to 60 minutes. Then, a rubbing operation is performed upon the orientation layer 15 so that the molecules thereof are oriented at a predetermined angle.

On the other hand, another about 0.5 to 1.5 nm thick transparent insulating substrate (counter substrate) 20 made of inorganic glass such as silica glass, boric silicic acid glass, alumina silicic acid glass or organic plastic is prepared. The counter substrate 20 is also cleaned and rinsed by cleaning liquid and pure water to remove contamination and particles on the surface thereof.

Next, an about 100 to 200 nm thick optical shield black matrix layer 21 made of Cr or CrO is deposited by a sputtering process. Then, the optical shield black matric layer 21 is patterned to form an opening OP of FIG. 9. Note that the optical shield black matric layer 21 can be made of a mixture of carbon black, titanium oxide powder, iron oxide powder or metal sulfide power with epoxy resin, acrylic resin, urethane resin, polyester resin, polyimide resin, polyolefin resin or gelatin.

Next, an about 0,5 to 2 µm thick red color filter layer 22(R) made of a colorant such as an organic pigment, an inorganic pigment or a dye mixed with epoxy resin, acrylic resin, urethan resin, polyester resin, polyamide resin, polyolefin resin or gelatin is coated and is patterned. In this case, the patterned red color filter layer 22(R) remains at predetermined openings of the optical shield black matrix layer 21 and also serves as a part of the columnar spacer CS'.

Next, an about 0,5 to 2 µm thick red color filter layer 22(R) made of a colorant such as an organic pigment, an inorganic pigment or a dye mixed with epoxy resin, acrylic resin, urethan resin, polyester resin, polyimide resin, polyolefin resin or gelatin is coated and is patterned. In this case, the patterned red color filter layer 22(R) remains at predetermined openings of the optical shield black matrix layer 21 and also serves as a part of the columnar spacer CS'.

Next, an about 0.5 to 2 µm thick blue color filter layer 22(B) is coated and is patterned. In this case, the patterned blue color filter layer 22(B) remains at predetermined openings of the optical shield black matrix layer 21 and also serves as a part of the columnar spacer CS'.

Next, an about 50 to 100 nm thick conductive layer made of ITO is deposited on the entire surface by a sputtering process. Then, the conductive layer 23 is patterned to form a counter electrode 23.

Next, an about 50 to 100 nm thick orientation layer 24 made of polyimide is coated on the conductive layer 23 except for the columnar spacer CS'. Then, the orientation layer 24 is baked at an temperature of about 200° C. for about 30 to 60 minutes. Then, a rubbing operation is performed upon the orientation layer 24 so that the molecules thereof are oriented at a predetermined angle.

The coupling of the above-described transparent insulating substrate 10 and the counter electrode 20 is explained as follows.

First, a seal material 36a including conductive peripheral spacers 36b is coated at an about 0.1 to 0.5 wide periphery of the transparent insulating substrate 10 except for the liquid crystal injecting opening IN using a screen printing process or a dispenser. In this case, the ratio of the conductive peripheral spacers 36b to the seal material 36a is about 0.1 to 5 wt %. On the other hand, about 70 display spacers 35 per mm$^2$ having a diameter of about 4 to 6 $\mu$m are dispersed onto a display area of the counter substrate 20 by using a wet-type or dry-type spacer dispersing apparatus. In this case, an area of the counter substrate 20 except for the display area is masked.

Next, the transparent insulating substrate 10 is aligned with the counter substrate 20, so that the transfer electrode 12' corresponds to the columnar spacer CS'.

Next, the seal material 36a is hardened by applying heat or ultraviolet irradiation thereto. As a result, the transfer electrode 12' is electrically connected to the counter electrode 23. In this case, since the diameter of the conductive peripheral spacers 36b is smaller than the gap where the data bus lines DL as well as the scan bus lines SL are formed, no stress is applied thereto.

Next, liquid crystal is injected by a vacuum process from the liquid crystal injecting opening IN into the gap between the transparent insulating substrate 10 and the counter substrate 20 within the sealing element 36.

Next, the liquid crystal injecting opening IN is sealed by clogging element 32 made of silicone resin, ultraviolet cured resin, epoxy resin or acrylic resin.

Finally, the outer surfaces of the transparent insulating substrate 10 and the counter substrate 20 are rinsed, and then, polarization plates 41 and 42 are adhered thereto.

Thus, the LCD apparatus is completed.

In the above-described first embodiment, although the seal material 36a is coated on the transparent insulating substrate 10, the seal material 36a can be coated on the counter substrate 20 or on both of the substrates 10 and 20. Also, although the display spacers 35 is dispersed onto the counter substrate 20, the display spacers 35 can be dispersed onto the transparent insulating substrate 10 or on both of the substrates 10 and 20.

According to the inventor's experiment, in a 10.2 cm (0.4 inches) LCD apparatus, when the conductive peripheral spacers 36b had a diameter of 3 $\mu$m and the density of the conductive peripheral spacers 36b was more than 200/mm$^2$ (0.1 wt %), the resistance between the counter electrode 23 and the transfer electrode 12' was less than 5 $\Omega$. Also, if the density of the conductive peripheral spacers 36b was 100/mm$^2$ (0.05 wt %), the increase of the above-mentioned resistance was not observed under a pressure-quicker test where the temperature was 105° C. and the duration time was 170 hours.

Figure 12:
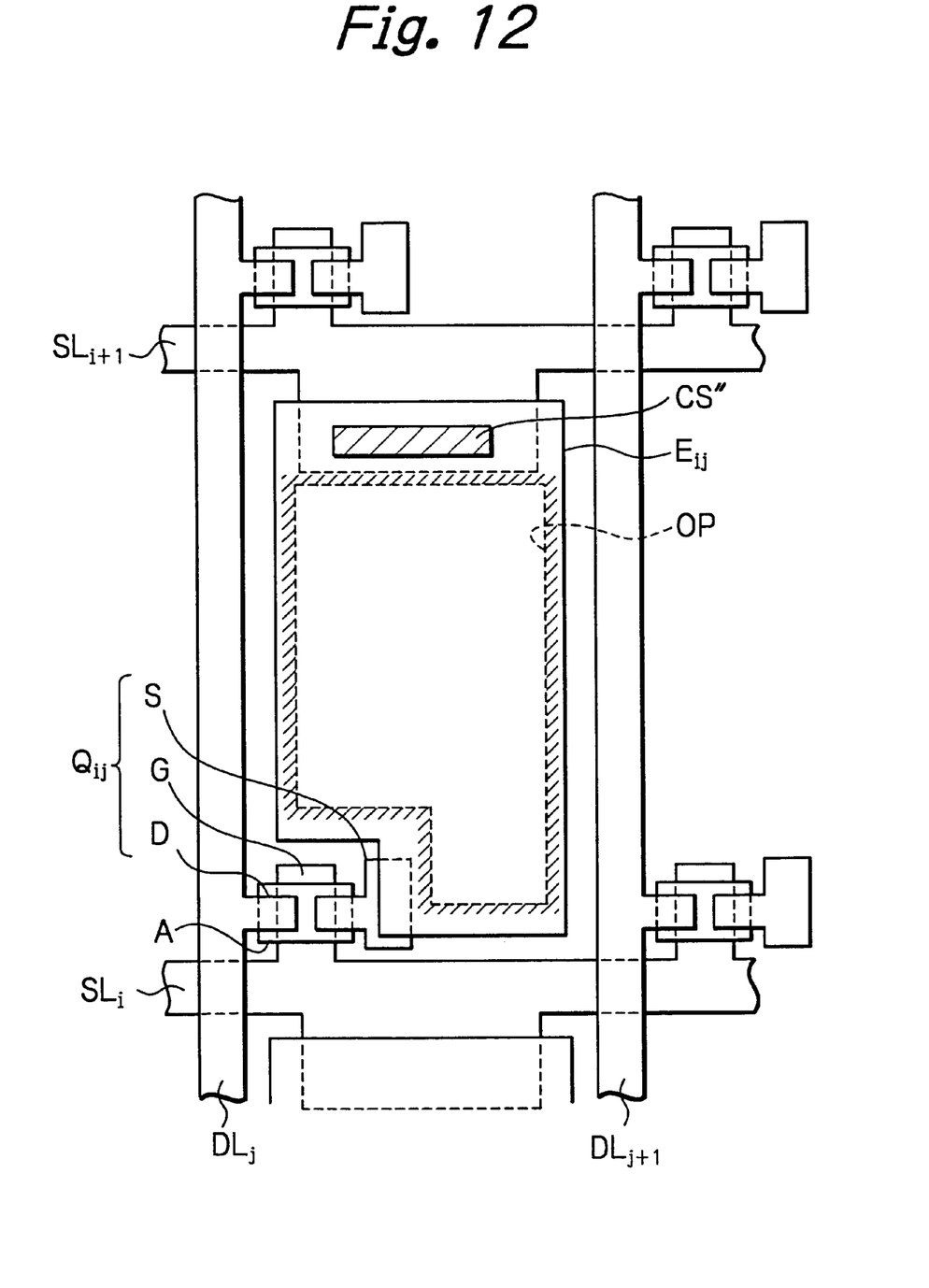
FIG. 12 is a plan view illustrating a pixel portion of a second embodiment of the LCD apparatus according to the present invention.
Figure 13:
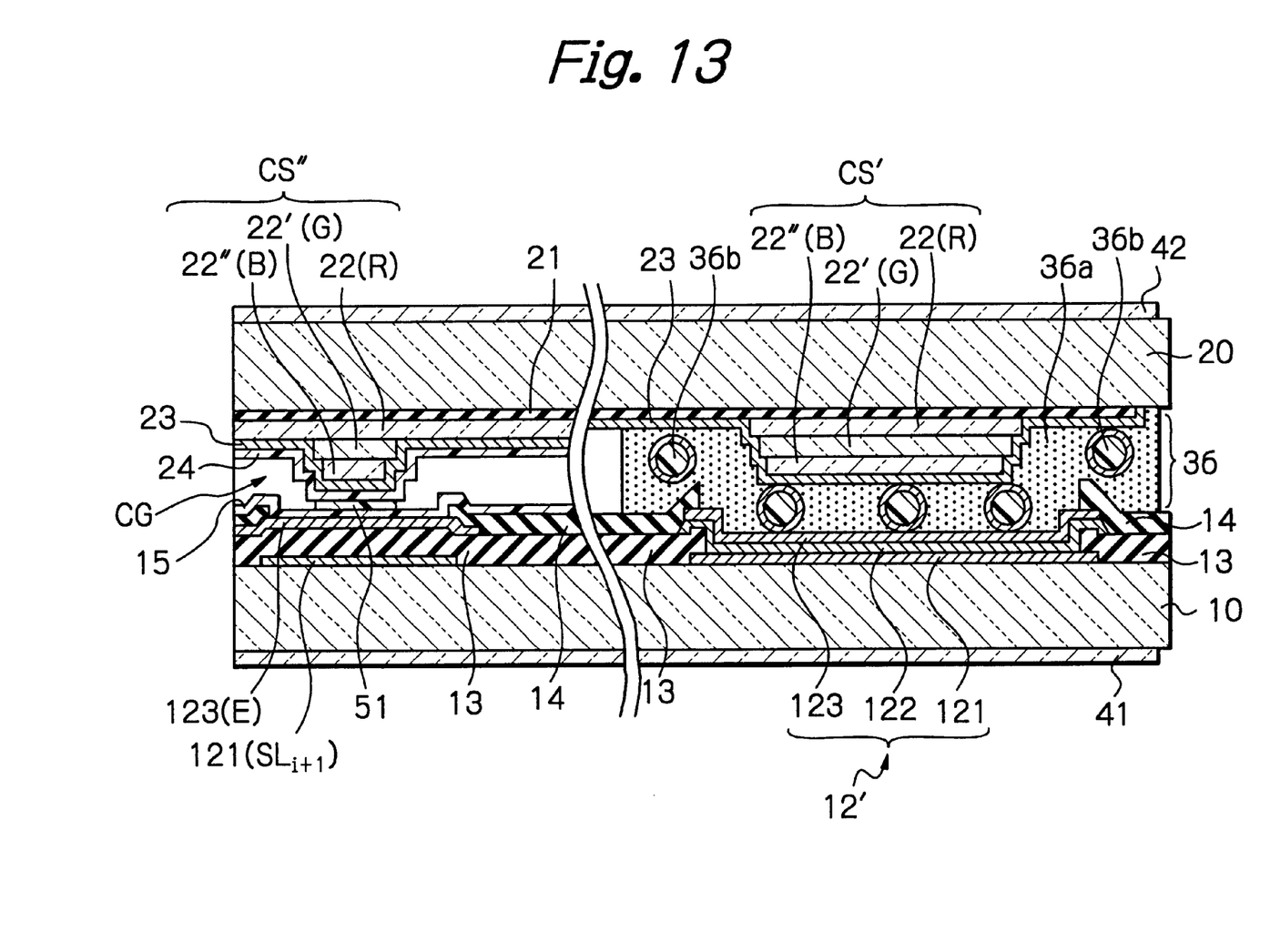
FIG. 13 is a cross-sectional view of the apparatus of FIG. 12.

FIGS. 12 and 13 illustrate a second embodiment of the LCD apparatus according to the present invention corresponding to FIGS. 9 and 10, respectively. Note that FIGS. 8 and 11 of the first embodiment are common in the second embodiment. That is, one columnar spacer CS" having the same structure as the columnar spacer CS' is provided at each pixel. In more detail, the columnar spacer CS" is located between the optical shield black matrix layer 21 and the adjacent scan bus line SL$_{i+1}$ which serves as an auxiliary capacitance forming electrode. Also, an insulating layer 51 is formed on the columnar spacer CS", so that the columnar spacer CS" and the insulating layer 51 serve as each of the display spacers 35 of FIG. 3. Thus, since the step for dispersing the display spacers 35 as in the first prior art LCD apparatus is unnecessary, the manufacturing cost can be further decreased.

In the above-described embodiment, only if the thickness of the insulating layer 51 and the diameter of the conductive peripheral spacers 36b are changed without changing the color filter layers 22, 22' and 22", can the cell gap CG be adjusted, which would reduce the turnaround time of LCD apparatuses.

Additionally, in the above-described second embodiment, since the display spacer formed by the column spacer CS" and the insulating layer 51 is not provided in the opening OP of the optical shield black matrix layer 21, the display quality is not deteriorated.

Further, in the above-described second embodiment, since the display spacer formed by the column spacer CS" and the insulating layer 51 is not provided on the scan bus line SL$_1$ and the data bus line DL$_j$, no stress is applied thereto.

Figure 14:
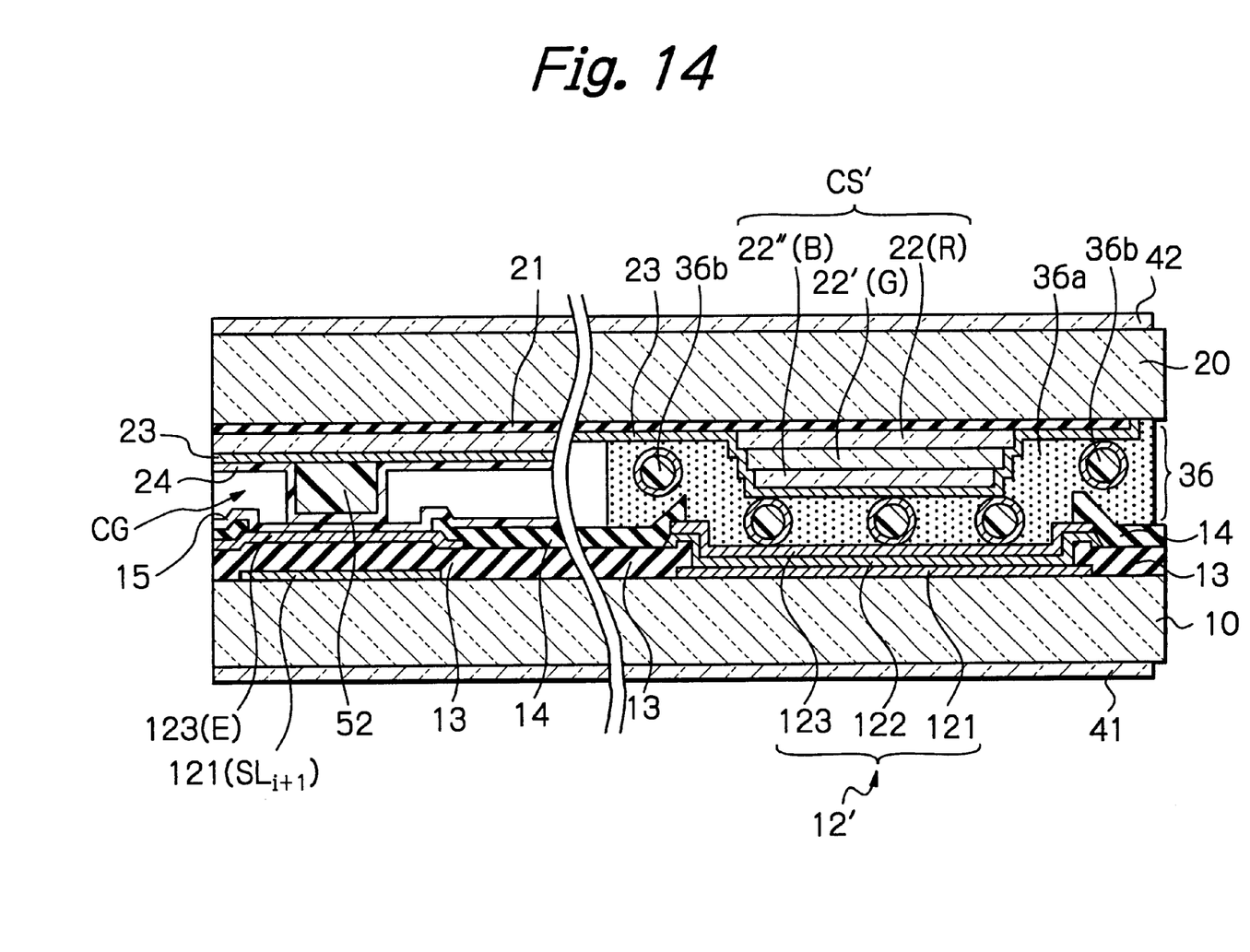
FIG. 14 is a cross-sectional view illustrating a modification of FIG. 13.

In FIG. 14, which illustrates a modification of FIG. 13, the column spacer CS" and the insulating layer 51 of FIG. 13 are replaced by an insulating layer 52 which also serves as a display spacer.

In FIG. 14, only if the thickness of the insulating layer 52 and the diameter of the conductive peripheral spacers 36b are changed without changing the color filter layers 22, 22' and 22", can the cell gap CG be adjusted, which would reduce the turnaround time of LCD apparatuses.

Also, in FIG. 14, since the counter electrode 23 is substantially distant from the other conductive layers such as the pixel electrode E$_{ij}$, the scan bus line SL$_j$ and the data bus line DL$_j$, as compared with the counter electrode 23 of FIG. 13, where the counter electrode 23 is provided between the columnar spacer CS' and the insulating layer 51, the parasitic capacitance therebetween is decreased to improve the display quality.

In the above-described second embodiment, the columnar spacer CS" along with the insulating layer 51, or the insulating layer 52 can be provided at all the pixels or some of the pixels.

As explained hereinabove, according to the present invention, the voltage at the counter electrode can be surely maintained at a predetermined value. Also, stress may not be generated so that irregular display may not occur, thus improving the display quality. Further, the data bus lines and the scan bus lines may not be disconnected. Additionally, the manufacturing cost can be decreased. Further, the electrical connection between the counter electrode and the transfer electrode is stable even if vibration or impact is applied to the LCD apparatus.

What is claimed is:

1. A liquid crystal display apparatus comprising:
   first and second insulating substrates;
   a transfer electrode formed on said first insulating substrate;
   a first columnar spacer formed on said second insulating substrate;

a counter electrode comprising a projecting portion which is formed on said first columnar spacer;

a sealing element, comprising seal material and conductive spacers, for adhering and sealing said first and second insulating substrates, so that said projecting portion of said counter electrode is in contact with said transfer electrode through said conductive spacers.

2. The apparatus as set forth in claim 1, wherein said first columnar spacer comprises color filter layers.

3. The apparatus as set forth in claim 1, wherein said sealing element is provided at a periphery of said first and second insulating substrates.

4. The apparatus as set forth in claim 1, further comprising:

at least one second columnar spacer formed on a display area of said second insulating substrate; and at least one insulating layer formed on said second columnar spacer, said second columnar spacer and said insulating layer serving as a display spacer.

5. The apparatus as set forth in claim 4, wherein said second columnar spacer comprises color filter layers.

6. The apparatus as set forth in claim 4, wherein said counter electrode is provided between said second columnar spacer and said insulating layer.

7. The apparatus as set forth in claim 1, further comprising:

at least one second columnar spacer comprising an insulating layer formed on a display area of said second insulating substrate, said second columnar spacer serving as a display spacer.

8. A method for manufacturing a liquid crystal display apparatus, comprising:

forming a transfer electrode on a first insulating substrate;

forming a first columnar spacer on a second insulating substrate;

forming a counter electrode on said first columnar spacer, so as to form a projecting portion of said counter electrode;

coating seal material including conductive spacers on a periphery of at least one of said first and second insulating substrates; and adhering said first and second insulating substrates so that said projecting portion of said counter electrode is in contact with said transfer electrode through said conductive spacers, after said seal material is coated.

9. The method as set forth in claim 8, wherein said first columnar spacer comprises color filter layers.

10. The method as set forth in claim 8, further comprising:

forming at least one second columnar spacer on a display area of said second insulating substrate; and forming at least one second columnar spacer on a display area of said second insulating substrate; and forming at least one insulating layer formed on said second columnar spacer, said second columnar spacer and said insulating layer serving as a display spacer.

11. The method as set forth in claim 10, wherein said second columnar spacer comprises color filter layers.

12. The method as set forth in claim 10, wherein said counter electrode is provided between said second columnar spacer and said insulating layer.

13. The method as set forth in claim 8, further comprising:

forming at least one second columnar spacer comprising an insulating layer on a display area of said second insulating substrate, said second columnar spacer serving as a display spacer.

14. A liquid crystal display comprising:

first and second insulating substrates;

a transfer electrode formed on said first insulating substrate;

a columnar spacer formed on said second insulating substrate;

a counter electrode comprising a projecting portion which is formed on said first columnar spacer; and a sealing material comprising at least one conductive spacer, formed between said first and second substrates, wherein said projecting portion of said counter electrode contacts said transfer electrode through said at least one conductive spacer.

15. The apparatus as set forth in claim 1, wherein said first and second insulating substrates comprise one of an inorganic glass and an organic plastic.

16. The apparatus as set forth in claim 1, further comprising:

an optical shield black matrix layer formed between said second insulating substrate and said first columnar structure, wherein said first columnar spacer comprises a first color filter layer having a thickness of about 0.5 to 2 $\mu$m, which is formed on said optical shield black matrix layer.

17. The apparatus as set forth in claim 16, wherein said first columnar spacer further comprises a second color filter layer having a thickness of about 0.5 to 2 $\mu$m, which is formed on said first color filter layer.

18. The apparatus as set forth in claim 17, wherein said first columnar spacer further comprises a third color filter layer having a thickness of about 0.5 to 2 $\mu$m, which is formed on said second color filter layer.

19. The apparatus as set forth in claim 1, wherein an electrical resistance between said counter electrode and said transfer electrode is less than 5 $\Omega$.

20. The apparatus as set forth in claim 1, wherein said first columnar spacer comprises a colorant and a resin.

* * * * *